United States Patent [19]

Granere

[11] Patent Number: 4,866,429

[45] Date of Patent: Sep. 12, 1989

[54] AUTOMATED MACHINE TOOL MONITORING DEVICE

[75] Inventor: Verne R. Granere, Ramona, Calif.

[73] Assignee: Scientific Atlanta, Inc., Atlanta, Ga.

[21] Appl. No.: 84,542

[22] Filed: Aug. 12, 1987

[51] Int. Cl.$^4$ .............................................. G08B 21/00
[52] U.S. Cl. .................................... 340/680; 340/665; 73/862.53; 364/474.17
[58] Field of Search ................ 340/680, 665; 364/475, 364/476; 73/862.53

[56] References Cited

U.S. PATENT DOCUMENTS 4,554,534 11/1985 Jones ................................. 340/680 X
4,633,720 1/1987 Dybel et al. ...................... 73/862.53

Primary Examiner—Joseph A. Orsino
Assistant Examiner—Jeffery A. Hofsass
Attorney, Agent, or Firm—Nilsson, Robbins, Dalgarn, Berliner, Carson & Wurst

[57] ABSTRACT

A device for monitoring the performance of an automated machine tool. Specifically, the device of the invention monitors the operation of a reciprocating appliance. The device of the invention measures the amount of force being exerted by the appliance during each operation. This information is analyzed by the device to determine the dimensional characteristics of each work piece. If the device calibrates that a particular work piece possesses an improper dimensional characteristic, e.g. thickness or hardness, then the device is designed to initiate a safety function, e.g. terminating the operation of the machine tool.

3 Claims, 2 Drawing Sheets

AUTOMATED MACHINE TOOL MONITORING DEVICE

BACKGROUND OF THE INVENTION

The present invention is directed to devices for monitoring automated machine tools, and in particular, automated machines which perform work using a reciprocating appliance.

Automated machine tools are used to perform various tasks upon metal, and in particular sheet metal and are in wide use today. Specific types of automated machine tools are those which reciprocally drive an appliance against successive work pieces to perform various tasks, e.g. cutting, drilling or punching the work piece.

Even though these types of machines are automated it is still necessary to monitor the progress of the work performed by each machine during the entire production run. Examples of presently available devices for monitoring automated machines are disclosed in U.S. Pat. Nos. 3,339,434, issued to Sparling; 3,440,848, issued to Zeitlin et al; 3,836,834, issued to Abbatiello et al; and 3,979,980 issued to Biester et al.

Generally presently available devices monitor the force being applied by the machine appliance to the work piece. These types of monitoring devices measure the amount of applied force to ensure that while a sufficient amount is being applied to perform the desired operation the applied amount will not exceed that amount which would cause damage to the work piece.

However, even when the force being applied is sufficient to carry out the intended operation there remains other variables which may effect the quality of the product being produced during the operation of the automated machine tool. For example, the physical dimensions of work pieces will vary from piece to piece. During the operation of an automated machine tool it is necessary to determine whether the piece upon which the work is being performed is within a suitable tolerance range. That is, each work piece needs to be evaluated in order to ensure that it possesses a proper thickness or hardness to ensure the suitability of the formed product. If such work piece does not possess a suitable dimension then the resulting product will not be useful for its intended purpose, or will be of such poor quality that it will have a shortened life expectancy.

Another parameter which is important to the functioning of the machine tool is the condition of the appliance being used, for example the condition of a stamp or punch. During the operation of the automated machine tool the appliance will experience wear. As the appliance continues to wear it will either fail to provide a clean cut through the work piece, or become subject to breakage. A worn appliance will increasingly roll or push the metal of the work piece aside instead of providing a clean cut, which will result in an unacceptable product that will have to be discarded. If the appliance is damaged because of severe wear then the reulting work pieces will also be damaged and unacceptable.

It is thus desirable to monitor not only the force being applied by the appliance, but also measure the tolerance of the work piece and the condition of the appliance during the course of operating a machine tool.

BRIEF DESCRIPTION OF THE DRAWINGS

The present invention may be better understood and its advantages will be apparent to those skilled in the art by reference to the accompanying drawings, wherein like reference numerals refer to like elements in the several Figures, and wherein.

SUMMARY OF THE INVENTION

Figure 1:
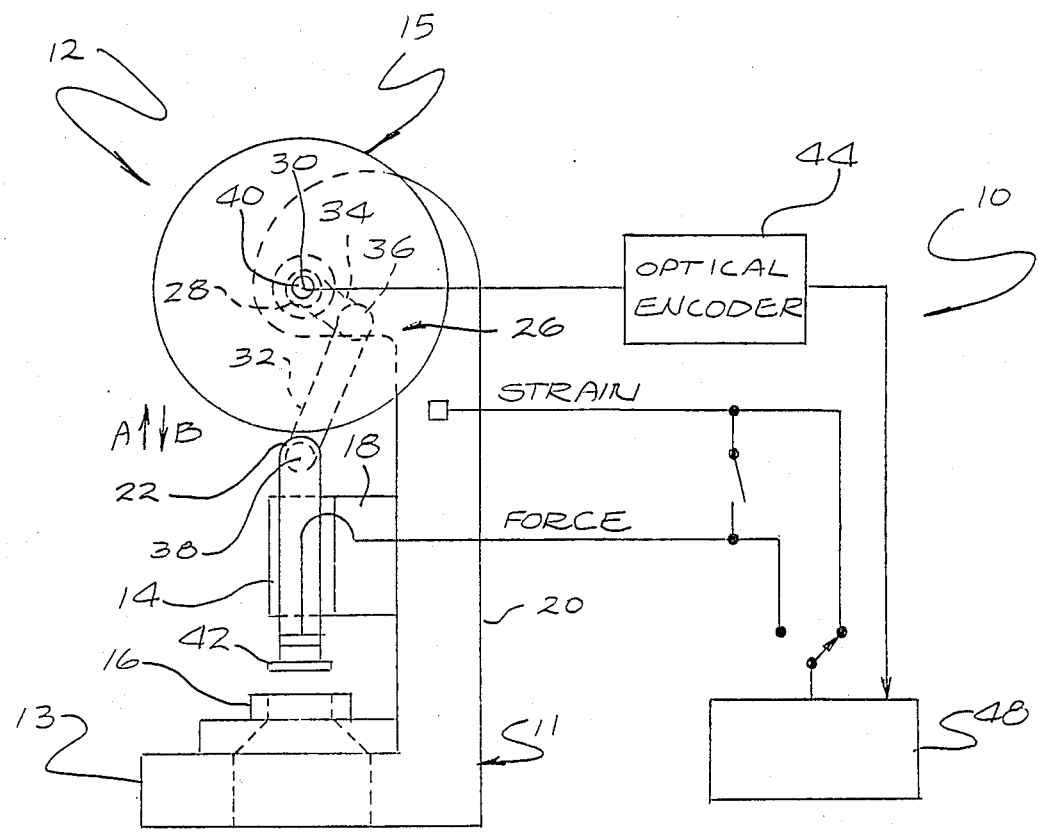
FIG. 1 is a schematic illustration of an embodiment of the device of the invention connected to an automated punch machine.

The present invention is directed to a device for monitoring the performance of an automated machine tool. Specifically, the device of the invention monitors the operation of a reciprocating appliance. The device of the invention measures the amount of force being exerted by the appliance during each operation. This information is analyzed by the device to determine the dimensional characteristics of each work piece. If the device calibrates that a particular work piece possesses an improper dimensional characteristic, e.g. thickness or hardness, then the device is designed to initiate a safety function, e.g. terminating the operation of the machine tool.

More specifically, the device of the invention includes apparatii for measuring when the appliance engages the work piece and for measuring the amount of force exerted on the appliance as it engages the work piece. These measurements are performed for each reciprocal stroke of the appliance.

The device further includes a processor board, having a suitable microprocessor and associated electronic circuitry for interfacing with the measuring apparatii. The microprocessor is programmed in accordance with suitable algorithms to calculate, from the provided measurements, the dimensional characteristics of each work piece, and to determine if each particular work piece is within the desired range for a particular physical characteristic. The processor board may also be programmed in accordance with suitable algorithms to calculate, from the provided measurements, the extent of the wear of the appliance during the reciprocal movement When the device calculates that the appliance becomes sufficiently worn a safety function is initiated, e.g. termination of the machine tool operation.

DESCRIPTION OF THE INVENTION

The present invention is directed to a device for measuring various performance parameters of a machine tool reciprocal appliance. These parameters may be used to determine the physical characteristics of each successive work piece, and/or may be used to determine the extent of the wear of a machine tool appliance. The device may also be designed to initiate a safety function when either a particular work piece possesses an improper physical characteristic, or when the machine tool appliance becomes sufficiently worn.

Basically, the invention is directed to a data acquisition and processing device which is useful for controlling an automated machine tool. In particular, the device of the invention includes suitable electronic circuitry for monitoring appropriate physical conditions under which the machine tool is operating and for generating signals indicative of these conditions.

The device of the invention further includes the necessary processing capability to interpret and perform the necessary algebraic operations on these signals in order to analyze the performance of the machine tool. Finally, the processing capability of the device can perform a comparison of the analyzed signals with predefined parameters in order to determine if the machine tool is operating adequately, or if work piece upon which the machine tool is acting is within a desired tolerance range for a specific physical characteristic.

Generally, the types of machine tools for which the device is useful are those which perform a particular task by the reciprocal movement of an appliance, e.g. a drill or cutting die, into engagment with successive work pieces. When the machine tool upon which the device is associated is a punch or stamping machine the device of the invention will include numerous apparatii for measuring various parameters. A first apparatus performs the measurement of the relative position of the appliance with respect to each successive work piece. This information is converted into suitable digital signals which are routed to a processing apparatus.

The device of the invention will also include a second apparatus which is operable for measuring the strain or force being applied to the die, e.g. a strain gauge or a force head, during each successive reciprocal stroke. Again this information is converted into suitable digital signals which are routed to the processing apparatus of the device.

The processing apparatus, which includes suitable programming, can then perform a desired algebraic operation on these signals, actually on the measurement indicated by these signals, to determine any one of numerous parameters.

For example, it may be desirable to determine the location of the appliance when it first engages the work piece for comparison with a given desired location of engagement. By comparing the actual location of engagement with the given desired location of engagement the device of the invention can calibrate the thickness of each work piece. A thicker work piece will be engaged earlier, with a thinner work piece being engaged later.

Another parameter which may be calculated by the device of the invention is the overall hardness of each successive work piece. Since the device can measure both the applied force to the appliance, as well as, the appliance location with respect to the work piece, if the overall force on the appliance increases dramatically with respect to the movement of the appliance then the work piece is relatively hard in comparison to a work piece where the overall force applied increases slowly in relation to the movement of the appliance.

It should be noted that the device of the invention may measure various parameters other than the force applied to and the relative postion of the appliance. For example, the device may be designed to measure the appliance acceleration or velocity during successive strokes, or measure the amount of current usage or power consumption of the machine tool.

It is further contemplated that the device's processing capability may be programmed with predefined parameters, for comparison with calculated parameters. This will allow the device to evaluate the performance of the machine tool. The device may also be designed with the necessary electronic circuitry, and processing capability to enable the device to develop each of the desired predefined parameters. This would involve the device measuring the operation of a successive number of reciprocal movements of the machine tool appliance, and using specifically programmed algorithms develop a standard parameter to compare futher reciprocal movements against, which parameter is usually an average of the previously measured reciprocal movements.

Referring now to FIG. 1, a device as seen generally at 10 in accordance with an embodiment will be described in greater detail. For the purposes of this discussion the device 10 is illustrated as connected to a punch press 12. However, the device 10 may also be connected to other types of reciprocating machine tools, e.g. stamping machines and drill presses.

Furthermore, the device 10 may be designed to allow for connection with multiple machine tools. For the purposes of this discussion a reciprocating machine tool includes those machine tools which include a reciprocally driven appliance. The reciprocally driven appliance may for the purposes of this discussion include any type of appliance which performs cutting, or in some manner removes a portion of the work piece upon which the operation is being performed, i.e. a drill or stamping die.

Furthermore, the device 10 will be described in relation to measuring the strain or force being applied to the punch press appliance, and to measuring the location or position of the punch press appliance with respect to the work piece. These particular measurements are for illustrative purposes, and it is to be understood that any other suitable measurement may be performed by the device 10.

The punch press 12 includes a stand 11, which includes a base 13 up from which a yoke 20 extends. The press 12 further includes an appliance assembly 14 which is mounted to the press yoke 20 for reciprocal movement towards and away from a work piece platform 16, which is mounted upon the press base 13. The appliance assembly 14 is a cylindrical assembly slidably positioned through a mount 18 to allow for its reciprocation. This mount 18 is secured directly to the yoke 20 of the press 12. The cylindrical appliance assembly 14 is driven towards and away from the work piece platform 16 by the operation of a driving mechanism 15.

In accordance with the illustrated invention the driving mechanism 15 includes a crank assembly 26 and a rotatable crank shaft 30, which are constructed in accordance with known designs A first end 22 of the appliance assembly 14 is pivotally connected to a first end 24 of the crank assembly 26. The opposite end 28 of the crank assembly 26 is fastened to the rotatable crank shaft 30. The crank shaft 26 is rotatably driven by an electric motor, not shown.

The crank assembly 26 includes two armatures 32 and 34 which are pivotally connected together at 36 to allow rotation. The armature 32 is pivotally connected to the appliance assembly end 22 at 38, while the armature 34 is fastened to an end of the crank shaft 30 at 40. The precise manner by which the various portions of the crank assembly 26 are pivotally connected is not critical to the invention, so long as each of the connected members are allowed to rotate freely with respect to each other.

When the electric motor is operated to rotate the crank shaft 30 the armature 34 will also be rotated in the same direction. As the armature 34 is rotated the other armature 32 will be moved first in an upwards direction, as indicated by arrow A, and then in a downward direction, as indicated by arrow B, by the rotation about the pivotal connection 36. The appliance assembly 14 will move in conjunction with the armature 32, thus moving first away from and then towards the work piece platform 16, respectively.

It should be noted that the driving mechanism 15 is not critical to the invention, and may be any suitable type of device which can facilitate the reciprocal driving of the appliance assembly 14 towards and away from the work piece platform 16. For example, the driving mechanism 15 may be a hydraulically operated ram which engages and drives the appliance assembly 14 in the desired manner.

At that end of the appliance assembly 14 opposite the first end 22 an appliance 42 is affixed, which in accordance with the illustrated embodiment is a stamp die. However, the appliance 42 may be a drill bit or other suitable cutting or forming tool.

The device 10 operates to monitor the performance of the punch press 12, that is the operation of the appliance 42 in its progress of cutting through a work piece, not shown, positioned on the work piece platform 16. That is, the device 10 is operated to monitor the precise position of the appliance 42 as it impacts upon the work piece, and also the amount of force being exerted upon the appliance 42 as it cuts through the work piece.

Accordingly, the device 10 includes a first apparatus 44, which measures the position of the to the work piece, and a appliance 42 with respect to the work piece, and a second apparatus 46 which measures the force exerted on the appliance 42 as it performs its operation. While various methods of measuring the position of the appliance 42 can be envisioned, in accordance with a preferred embodiment the first apparatus 44 measures the rotational position of the crank shaft 30, and is more preferably an optical encoder.

When the first apparatus 44 is an optical encoder, it is mounted to an end of the shaft 30. The optical encoder is a device which can measure incremental movement about an arc of a rotating member when attached thereto. Examples of a suitable optical encoder is the Rotaswitch R, sold by Disc Instruments, Inc., 102 East Baker Street, Costa Mesa, Calif. 92626.

By selecting the proper type of optical encoder for use as the first apparatus 44, and mounting the same to the shaft 30 any desired incremental unit of movement can be measured. That is, the appliance assembly 14 may only be moved between a limited rotational arc of the shaft 30 with the actual work performed by the appliance 42 being within a very narrow rotational range, e.g. 180 degrees. Thus it would only be necessary to measure a narrow rotational range, e.g. from 90 to 270 degrees of rotation of the crank shaft 30.

The optical encoder selected may sense any number of incremental points through the particular rotational range, with each incremental point correlating to a defined distance of travel of the appliance assembly 14. Generally, the greater the number of incremental units sensed the greater the degree of measuring the actual movement of the appliance 42 towards and away from the work piece. It is preferable to use an optical encoder which can measure from 512 to 2048 incremental points of rotation of the shaft 30.

If the driving mechanism 15 includes other than a rotatably driven shaft, e.g. a hydraulic piston, then another type of measuring apparatus must be selected for the first apparatus 44. For example, an optical enclosed linear encoder sold by Disc Instruments, Inc, may be substituted for the optical encoder as the first apparatus 44. The only requirement for the first apparatus 44 of the device 10 is that it be able to measure definite incremental movement of the appliance 42 both towards and away from the work piece.

The second apparatus 46 of the device 10 measures the amount of stress beginning applied to the appliance 42 as it is moved towards and away from the work piece. For example, the second apparatus 46 may be a force head, such as the piezoelectric force transducer element sold by PCB Piezotronics, Inc. of Depew, N.Y., specifically for monitoring press operations, which can be mounted directly in the appliance assembly 14, and/or a strain gauge, which can be mounted directly to the yoke 20. Other suitable stress or force measuring mechanisms may be substituted for the force head or strain gauge, provided that such mechanism is capable of definitely measuring the amount of force being applied directly to the appliance 42.

Both the first apparatus 44 and second apparatus 46 of the device 10 are connected to a data acquisition system 48, which will be described in greater detail herein. Typically, the various measurement apparatii 44 and 46 of the device 10 are connected by suitable cables to the system 48 to allow for the transmission of signals therebetween. That is both the first apparatus 44 and second apparatus 46 will generate electronic signals indicative of the specifically measured parameter, which signals are routed to the data acquisition system 48.

It should be noted that the types of signals being generated by the first and second apparatii 44 and 46 are typically an analog signal, while the system 48 may utilize either analog or digital signals depending upon the electronic circuitry of the system 48.

The data acquisition system 48 is operable for performing suitable mathematical operations on the signals received from the first and second apparatii of the device 10, which mathematical operations will be dependent upon the type of characteristic being analyzed by the device 10. For example, the location of the appliance 42 in relation to the work piece may be used in combination with the force being applied to the appliance 42 in the performance of a particular mathematical operation to determine how quickly the force is increasing with respect to the movement of the appliance 42. This type of mathematical operation allows the system 48 to determine the relative hardness of each particular work piece.

Figure 2:
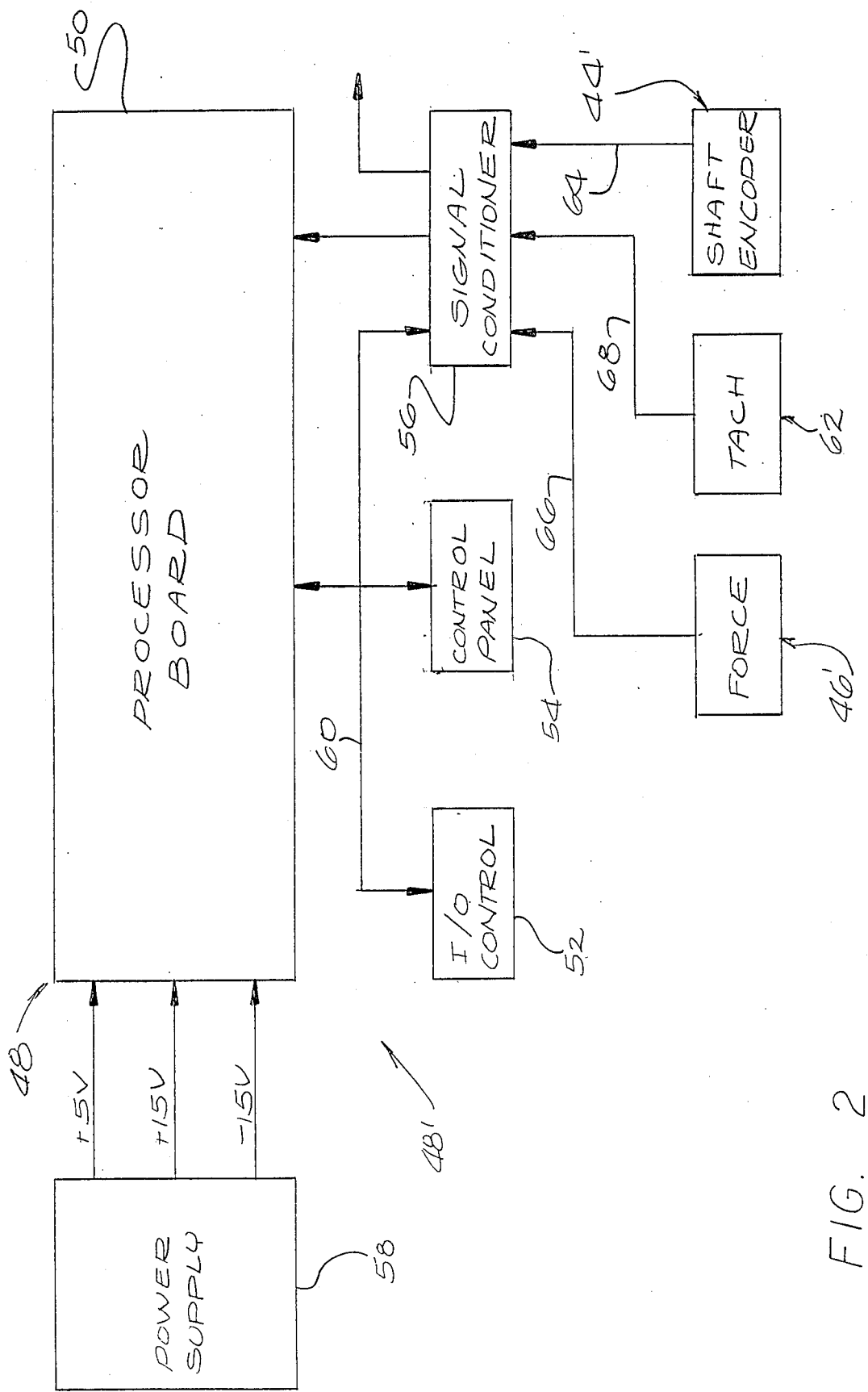
FIG. 2 is a block diagram of the overall arrangement of a device in accordance with an embodiment of the invention.

Referring to FIG. 2, a block diagram of the device 10 illustrating in particular the data acquisition system 48 is seen. The data acquisition system 48 includes a processor board 50, a I/O control board 52, control panel 54, a signal conditioner 56 and a power supply 58. The processor broad 50, I/O control board 52, control panel 54 and signal conditioner 56 are connected over a suitable signal bus 60, which routes the various signals between the connected portions of the system 48, and between the system 48 and the other components of the device 10.

The first and second apparatii, indicated by the respective block 44' and 46', are connected via suitable signal transmitting conduits 64 and 66, e.g. cables, to a signal port of the signal conditioner 56 of the data acquisition system 48. Further connected by a suitable connector 68 to a suitable signal port of the signal conditioner 56 is a tachometer 62, whose function will be described herein.

The processor board 50 generally includes a microprocessor and the necessary electronic circuitry to allow the system 48 to perform the necessary mathematical operations on the data signals being supplied by the first and second apparatii 44 and 46. Furthermore, the system 48 may be connected to multiple groupings of first and second apparatii 44 and 46, with each grouping being independently connected to separate machine tools 12. Thus the system 48 will have to differentiate between the various pairs of first and second apparatii 44 and 46 in order to properly analyze the data. This is typically performed by giving each group of apparatii 44 and 46 the necessary electronic hardware to generate a signal having a predefined source address. This source address indicates from which of the apparatii groupings the signals have been received. The source address may also indicate whether the signals were generated by a first or second apparatii 44 or 46.

The processor board 50 typically includes a microprocessor, which may be a CPU 68010, and associated electronic circuitry which reads the address portion of a signal and determines whether the signal was generated by a first or second apparatus.

The processor board 50 may also include the necessary electronic circuitry to perform certain necessary mathematical operations upon the measurements indicated by a particular signal. For example, the processor board 50 may include one or more preprogrammed RAM or ROM chips, which chips include the necessary programming to perform one or more mathematical operations. Furthermore, one or more of the chips, as well as the microprocessor may also include programming, in accordance with suitable algorithms, for generating and routing the necessary signals to the machine tool 12 to initiate a safety function. This safety function may for example cause the interruption of the machine tool 12 if for example the appliance 42, i.e. stamping appliance, has been determined to be sufficiently worn to require replacement.

Interface between the processor board 50 and the various first and second apparatii 44 and 46 is performed by the signal conditioner 56. This signal conditioner 56 includes, for example, the necessary electronic circuitry to protect the processor board 50 from electrical surges and to reject electronic signal noise caused by relays, motors, power lines and other apparatuss of the machine tool 12 and/or apparatus 44 or 46.

For example, the signal conditioner 56 may include the necessary filters, amplifiers and analogue to digital converter. Further, this signal conditioner 56 will include the necessary signal ports for connection to the system bus 60 and to the various first and second apparatus 44 and 46.

The interface between the processor board 50, and thus the system 48, and the various machine tools 12 is performed by the I/O control board 52. This board 52 will include the necessary electronic circuitry for interfacing with and terminating the operation of, and/or initiating a modification in the running of the machine tool 12. That is, this board 52 will include electronic circuitry which will convert the digital signals of the processor board 50 to the appropriate signals for routing to the machine tool 12. These signals will then cause a specific operation of the machine tool 12, e.g. terminating or adjusting the operation of the appliance assembly 14 or driving mechanism 15.

The control panel 54 provides an interface with an operator of the system 48, and thus of the device 10. That is, the control panel 54 will include the necessary hardware for indicating the level of a certain parameter, e.g. the level of the force being applied to the appliance 42, or the position of the appliance 42. Furthermore, the panel 54 may also include the necessary electronic hardware to allow the operator to manually adjust the various predefined levels, or allow the operator to cause the machine tool 12 to adjust for certain levels or terminate operation.

Finally, the system 48 will include a power supply 58 which provides the necessary power for the entire system 48. That is, the processor board 50, signal conditioner 56, I/O board 52 and panel 54 may require the same or different voltage levels. The power supply 58 will supply the required voltage levels through the processor board 50 and over the system bus 60 to the other portions of the system 48.

As already stated, the signal conditioner 56 is connected to a tachometer 62, as well as, the first apparatus 44', i.e. the optical encoder, and the second apparatus 46', i.e. force head and/or strain gauge. The tachometer functions similar to a clock in that it causes the resetting of the various programs being run on the signals being generated by the first and second apparatus 44 and 46 of each machine tool 12.

That is, each machine tool 12 will be connected to a separate tachometer 62 which will monitor a complete cycle of the appliance assembly 14. After each complete cycle the tachometer 62 will generate a signal which is routed to the processor board 50, through the signal conditioner 56, which signal causes each of the programs being operated to cycle back to their initial settings. This ensures that only a single complete cycle for each appliance assembly 14 will be used to determine whether the machine tool 12 is functioning properly.

In particular, the tachometer 52 is used in the embodiment illustrated in FIG. 1 to indicate when the shaft 30 completes one complete revolution. This ensures that only a single cycle of the machine tool 12, that is one complete revolution of the shaft 30 will be examined at a time. If a driving mechanism 15, other than that described and illustrated in FIG. 1 is used to reciprocate the appliance assembly 14, then it may be necessary to substitute another device for the tachometer 62 for indicating one complete cycle.

As stated, the device 10 will measure the various operating parameters of the machine tool 12, and perform numerous mathematical operations on the resulting measurements to determine the performance of the tool 12. In the illustrated embodiment, these operating parameters which are measured include the location or position of the die, appliance 42, in relation to the work piece, and also measuring the amount of force being applied against the appliance at each measured position. Various mathematical operations are performed on these measured operating parameters to determine the thickness and hardness of the work piece, and also for determining the wear of the appliance.

Basically, the mathematical operations can be summarized as preparing a plot of the measured position of the appliance vs. the force being applied to the appliance. The force is determined by the signals generated by the force head or strain gauge discussed above, while the position is determined by the relation of the rotational position of the crank shaft 30 using the optical encoder. A plot is thus prepared for each complete cycle of the machine tool. Each prepared plot is compared against a standard plot idealizing the relative positions of the appliance vs. the applied force.

This standard plot can either be manually entered by the operator into the device 10, more particularly entered through the control panel 54 of the system 48, or the machine tool 12 can be run for a defined number of runs with the various runs being individually plotted by the system 48. These separate plots are then averaged to provide a standard plot having a given variance. It is then this standard plot against which all subsequently prepared plots are compared.

Figure 3:
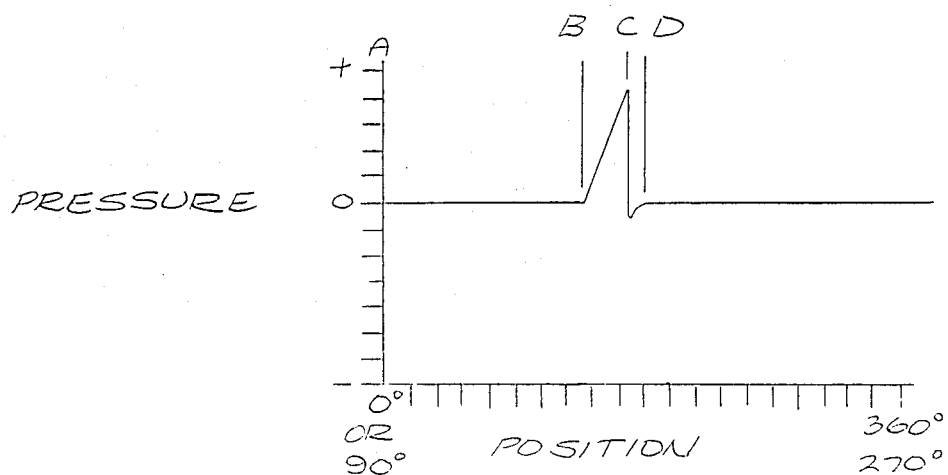
FIG. 3 is a graph diagrammatically illustrating the plotting of force exerted on the appliance vs. the position of the appliance, which plot represents the mathematical operations to determine the thickness and hardness of the work piece, as well as, the wear of the appliance.

If the plots subsequently prepared do not fall within the given variance then the system 48 operates the I/O control board 52 to cause either the adjustment or termination of the operation of the machine tool 12. For purposes of this discussion only a plot indicating the general relationship of the applied force vs. the relative position of the appliance is shown in FIG. 3. It is to be understood that this plot is only a representative illustration of the mathematical calculation performed by the programming included in the processor board 50 for comparing the standard plot against the individually prepared plots. Typically, the programming will include look-up tables which include the various related forces applied to the appliance as related to the position of the appliance with respect to the work piece. As these two parameters are being measured by the device 10 the resulting parameters are compared against these look-up tables to determine if the parameters fall within the given variance.

Referring now to FIG. 3, the position A represents the initial position of the machine tool appliance 42. This position A will automatically be registered upon the reception of a signal from the tachometer 62 which indicates the completion of one complete revolution of the shaft 30. Until the appliance 42 is moved into engagement with the work piece no force should be registered on the appliance 42. Once the appliance 42 engages the work piece an initial force is registered, this position is indicated as point B.

This point B is compared to a respective point B on the standard plot, in reality the look-up table. If this point B is within a given variance to the position of the point B on the standard plot then the work piece is of the proper thickness. However, if this point B falls on the plot earlier than the respective point B on the standard plot then the work piece is too thick, while if this point B falls on the plot later than the respective point B on the standard plot then the work piece is too thin. In either case the system 48 indicates a fault in the work piece and either causes a modification in the operation of the machine tool 12, or terminates its operations.

As the appliance 42 moves through the work piece the amount of force being exerted and thus measured increases in a manner dependent upon the hardness of the work piece. This hardness is represented by the slope of the plot between points B and C, with C being that point at which the force exerted on the appliance reaches its maximum. The slope of the plot from point B to point C will increase rapidly if the work piece is hard, while the slope will be more gradual if the work piece is soft. Thus by comparing the measured slope to the slope of the curve in the standard plot the system 48 can determine if the work piece upon which the work is being performed is within the desired variance, and will take the appropriate corrective steps if the hardness of the work piece falls outside of the acceptable variance.

Finally, the system 48 will calculate the force being applied against the appliance 42 between points C and D. Since this portion of the plot represents the withdrawal of the appliance 42 out of the work piece the resulting curve of the plot between these two points should be linear. If the curve of this plot is other than linear then the appliance 42 has been sufficiently worn away to require its removal. That is, when the appliance 42 becomes worn it will not satisfactorily cut the work piece and force will be exerted on the appliance as the machine tool pulls the appliance out from the work piece. This degree of force is indicated as a dip below the base line seen in the plot of FIG. 3. Once this condition is indicated the system 48 indicates through the operation of the I/O control board 52 the inactivation of the machine tool 12, and if desired activates a warning indicator on the control panel 54.

As stated, the plot, as well as the accompanying discussion, diagrammatically illustrates the operation of the programming provided the system 48. However, if desired the control panel 54 can include a plotter which will provide an operator with a read-out of this plot for each stroke of the machine tool 12 as indicated by one complete revolution of the shaft 30.

While the preferred embodiment has been described and illustrated, various substitutions and modifications may be made thereto without departing from the scope of the invention. Accordingly, it is to be understood that the present invention has been described by way of illustration and not limitation.

What is claimed is:

1. A device for monitoring the working of an automated machine including a reciprocating appliance compromising:

stroke measuring means associated with said reciprocating appliance, which reciprocating appliance is moved from a first neutral position into working contact with a work piece, said stroke measuring means measuring the movement in defined incremental units of said appliance from said neutral position into said working contact with said work piece and back away from said work piece;

force measuring means associated with said machine and operable for measuring a force applied to said appliance as said appliance engages said work piece;

processing means which communicates with said stroke measuring means and said force measuring means and is operable to determine an extent of said force applied to said appliance as measured by said force measuring means for each incremental movement measured by said stroke measuring means, wherein said processing means is further operable for comparing that incremental unit said appliance engages said work piece with a given range of incremental units at which said appliance is to engage said work piece, and is further operable to indicate when said incremental unit determined for said appliance is not within said range of incremental units; and said processing means further being programmed to analyze said extent of force applied to said appliance for each incremental unit to determine when said appliance engages said work piece and when said appliance is removed from said work piece.

2. The device of claim 1 wherein said processing means includes data acquisition and processing functions to allow said processing means to perform operations on said measurements made by said stroke measuring means and said force measuring means and is programmed with a given range of said incremental measured locations at which said appliance should contact said work piece and is also programmed to analyze said measurements made by said stroke measuring means which optically reads the reciprocal movement of said appliance and generates a signal indicative of the relative location of said appliance to said work piece and said force measuring means to determine at which reciprocal location of said appliance said work piece is engaged, said processing means is further programmed to calculate whether said determined incremental location is within said given range and to initiate a safety function if said determined incremental location is not within said range.

3. The device of claim 2 wherein said processing means is further operable to compare said forces measured by said force measuring means for each of said incremental units measured by said stroke measurement means as said appliance is being withdrawn from said work piece with a predetermined value and is operable to indicate when said forces measurement exceed said predetermined value, whereby said device indicates failure of said appliance when said predetermined value is exceeded.

* * * * *

UNITED STATES PATENT AND TRADEMARK OFFICE
CERTIFICATE OF CORRECTION

PATENT NO.   : 4,866,429
DATED        : SEP. 12, 1989
INVENTOR(S)  : VERNE R. GRANERE

It is certified that error appears in the above-identified patent and that said Letters Patent is hereby corrected as shown below:

| COLUMN | LINE | |
|---|---|---|
| 1 | 58 | Delete "reulting" and insert --resulting--. |
| 2 | 49 | Insert --.-- after "movement". |
| 3 | 16 | Delete "engagment" and insert --engagement--. |
| 3 | 58 | Delete "postion" and insert --position--. |
| 4 | 49 | Insert --.-- after "designs". |
| 5 | 30 | Delete "to the work piece, and a". |
| 6 | 1 | Insert --.-- after "Inc". |
| 6 | 55 | Delete "broad" and insert --board--. |
| 7 | 46 | Delete "apparatuss" and insert --apparatus--. |
| 10 | 34 | Delete "compromising" and insert --comprising--. |

Signed and Sealed this

Thirteenth Day of November, 1990

Attest:

HARRY F. MANBECK, JR.

*Attesting Officer*     *Commissioner of Patents and Trademarks*